(12) United States Patent
Zink

(10) Patent No.: US 9,844,845 B1
(45) Date of Patent: Dec. 19, 2017

(54) COIL CLAD HOSE ASSEMBLY APPARATUS AND METHOD

(71) Applicant: STONEAGE, INC., Durango, CO (US)

(72) Inventor: Gerald P. Zink, Durango, CO (US)

(73) Assignee: Stoneage, Inc., Durango, CO (US)

( * ) Notice: Subject to any disclaimer, the term of this patent is extended or adjusted under 35 U.S.C. 154(b) by 281 days.

(21) Appl. No.: 14/693,477

(22) Filed: Apr. 22, 2015

Related U.S. Application Data (60) Provisional application No. 61/984,992, filed on Apr. 28, 2014.

(51) Int. Cl.
   - *B23P 19/04* (2006.01)
   - *B23P 17/04* (2006.01)
   - *F16L 35/00* (2006.01)

(52) U.S. Cl.
   CPC ............ *B23P 19/04* (2013.01); *B23P 17/04* (2013.01); *F16L 35/00* (2013.01); *Y10T 29/49435* (2015.01)

(58) Field of Classification Search
   CPC  B23P 19/04; B23P 17/04; F16L 35/00; Y10T 29/49435
   See application file for complete search history.

(56) References Cited

U.S. PATENT DOCUMENTS

| | | | |
|---|---|---|---|
| 3,524,244 A * | 8/1970 | Elliott | B65H 81/08 140/92.2 |
| 4,312,679 A | 1/1982 | Klein, Sr. | |
| 5,988,226 A | 11/1999 | Matthews | |
| 6,390,141 B1 | 5/2002 | Fisher et al. | |
| 9,550,649 B2 * | 1/2017 | Zink | B65H 51/10 |
| 2011/0220700 A1 | 9/2011 | Zink | |

* cited by examiner

*Primary Examiner* — John C Hong
(74) *Attorney, Agent, or Firm* — Greenberg Traurig, LLP (57) ABSTRACT

A process for assembling a coil clad hose includes suspending a spring wire helix between carriages mounted on a rail, rotating one of the ends of the helix to expand the helix, inserting a hose through the expanded helix, contracting the helix onto the hose, installing an end fitting onto each end of the hose, fixing one end of the helix together with the ferrule and the hose at one end of the hose, adjusting a pitch of the helix along the hose to another end of the hose, and fixing the helix and the hose together with the ferrule at the another end of the hose. The apparatus includes a rail, a pair of carriages movably supported on the rail, each of the carriages having a through bore holding a tang clamp bushing therein, and a pair of cable clamp fixtures mounted one at each end of the rail.

13 Claims, 12 Drawing Sheets

COIL CLAD HOSE ASSEMBLY APPARATUS AND METHOD

CROSS REFERENCE TO RELATED APPLICATIONS

This application claims the benefit of U.S. Provisional Patent Application No. 61/984,992 filed Apr. 28, 2014, entitled Coil Clad Hose Assembly Apparatus And Method, which is hereby incorporated by reference in its entirety.

BACKGROUND OF THE DISCLOSURE

A high pressure coil wrapped hose is disclosed in US Patent Application Publication No. 2011/0220700 in combination with a system for propelling such a coil clad hose. Wrapping a helical coil around a high pressure hose in a manner to preclude slippage of coil turns on the hose when subjected to manipulation forces is not a simple task and presents a number of difficulties. For example, if such a coil clad hose has a coil that is loosely wound about the hose, slippage of the coil on the hose exterior surface can occur when a propelling mechanism engages portions of the coil and tries to push the hose axially against resistance within the piping system into which the hose is disposed. This at best leads to inaccuracies in gauging the position of the distal end of the hose and at worst causes the coil to bunch along the hose and prevent the drive mechanism from pushing the hose at all. The present disclosure addresses this difficulty in a new manner.

SUMMARY OF THE DISCLOSURE

One exemplary embodiment of a process for assembling a coil clad hose in accordance with the present disclosure includes operations of supporting a metal wire coil helix between two carriages on a rail, expanding the helix, passing a hose into and through the helix, contracting the helix onto the hose, fixing one end of the helix to one end of the hose, adjusting a pitch of each coil turn of the helix on the hose from the one end of the helix to an opposite end of the helix a desired amount, and fixing an opposite end of the helix to an opposite end of the hose.

One exemplary process for assembling a coil clad hose in accordance with the present disclosure may comprise suspending a spring wire coil helix between two carriages mounted on an axially extending rail, threading a cable through a hose and through the helix suspended between the carriages, rotating one of the ends of the helix to expand the helix, inserting one end of the hose suspended on the cable through the expanded helix, counter rotating the one end of the helix to contract the helix onto the hose, installing an end fitting and a ferrule onto each end of the hose, fixing one end of the helix together with the ferrule and the hose at one end of the hose, adjusting a pitch of the helix along the hose to the other end of the hose, and fixing the helix and the hose together with the ferrule at the other end of the hose.

An exemplary process for assembling a coil clad hose in accordance with the present disclosure may comprise threading a support member such as a cable through a spring wire coil helix and a hose. The helix is then suspended between two carriages mounted on an axially extending rail and the support member is fastened to a clamp mounted at each end of the rail. One of the ends of the helix is then rotated to expand the helix. One end of the hose suspended on the support member is threaded through the expanded helix. The one end of the helix is then counter-rotated to contract the helix onto the hose. An end fitting and a ferrule is then installed onto each end of the hose and one end of the helix is fixed together with the ferrule and the hose at one end of the hose. A pitch of the helix along the hose to the other end of the hose is then adjusted. Finally, the helix and the hose together with the ferrule at the other end of the hose are fixed in place to complete the assembly. The support member is then unclamped and the assembled coil clad hose is pulled from the support member.

An exemplary embodiment of an apparatus for assembling such a coil clad hose includes an elongated rigid rail having a first end and a second end. A first end cable clamp is mounted on the first end of the rail. A second end cable clamp is mounted on the second end of the rail. A first movable carriage is mounted on the rail and spaced from the first end of the rail. The first carriage has a first through passage and has a gearbox and a first coil tang bushing mounted around the first through passage. The gearbox connects a drive motor having a drive sprocket engaging corresponding features, such as notches, in the rigid rail. A second movable carriage is mounted on the rail and spaced between the first carriage and the second end of the rail. The second carriage has a second through passage. A cable is removably fastenable to and stretched between the first and second cable clamps such that the cable is arranged to pass through the through passages in the first and second movable carriages.

An apparatus for producing a coil clad hose in accordance with the present disclosure preferably includes a first carriage and a second carriage movably supported on an axially extending linear rail preferably having a rectangular cross section. The upper side of the linear rail includes a series of notches or cutouts for receiving a complementary gear of a drive motor attached to the carriage. A pair of cable clamps is mounted to opposite ends of the rail. Each of the carriages includes a through bore carrying a tang clamp bushing. Each tang clamp bushing is configured to receive and hold one end of a spring coil wire helix therein. The cable clamps are configured to hold a cable under tension suspended therebetween passing through each of the bushings and through each of the carriages.

The apparatus for assembling a coil clad hose in accordance with the present disclosure preferably includes an elongated rail, a pair of carriages movably supported for translation back and forth on the rail, each of the carriages having a through bore holding a tang claim bushing therein, and a pair of cable clamp fixtures mounted one at each end of the rail. At least one of the carriages is configured to rotate its tang clamp bushing. At least this one carriage further includes a traversing gearbox for translating the carriage along the rail synchronized with rotation of the clamp bushing in order to adjust the pitch of each turn of a spring wire coil wrapped on a length of hose suspended on a cable stretched between the cable clamp fixtures and through the carriages. Other features and advantages of the apparatus for assembling a coil clad hose and method of assembly will become more apparent from a reading of the following detailed description when taken in conjunction with the drawings.

DETAILED DESCRIPTION

Figure 1:
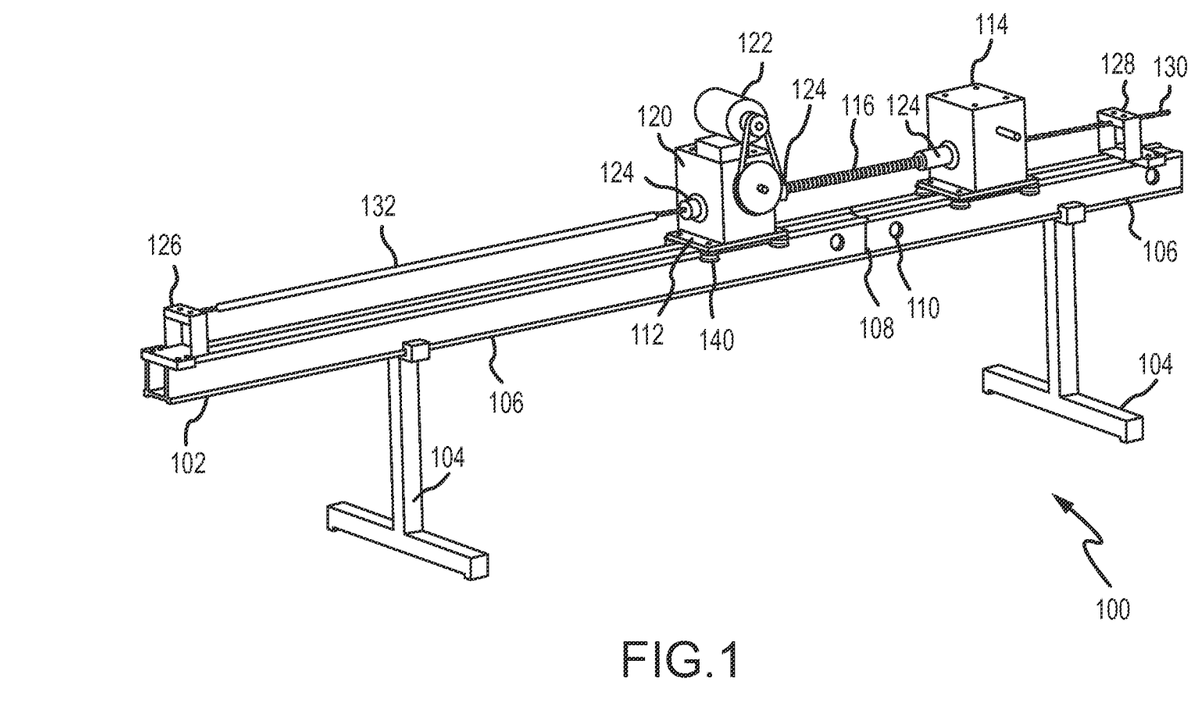
FIG. 1 is a side perspective view of an apparatus for assembling a coil clad hose in accordance with the present disclosure.

FIG. 1 shows a side perspective view of one embodiment of an apparatus 100 for assembling a coil clad hose in accordance with the present disclosure. The apparatus 100 includes an elongated rigid rail 102, preferably a 4 inch square cross section metal rail. In the figures, the length of the rail and hose elements shown are foreshortened to make the drawing figures more readable. In practice, however, it is to be understood that he hose 132 could be about 75 feet long and the rail utilized on the order of 160 feet long. This rail 102 may be made of aluminum or steel or other metal and is supported from a floor by two or more rail stands 104. The rail 102 typically is formed in manageable sections 106, say 10-20 feet long. The sections 106 are joined by a splice 108 inserted into the rail ends and pinned via expansion pins 110 to the abutting mated ends of the rail sections 106.

A suitable wire coil helix 116 utilized in the present disclosure is produced by Schaff International and is made from flattened music wire. This music wire is about 0.060" thick and 0.170" wide in cross section. It is formed into a left hand helix of 0.400" internal diameter and 0.250" pitch, with the wide face of the wire tangent to the internal diameter. A similarly suitable high pressure hose is Spirstar 5/4 hose or 6/2 hose, which have 0.440" and 0.450" outer diameters respectively. Other assemblies of larger and smaller diameters to accommodate various desired fluid flows and pressures are envisioned and are within the scope of the present disclosure.

Figure 2:
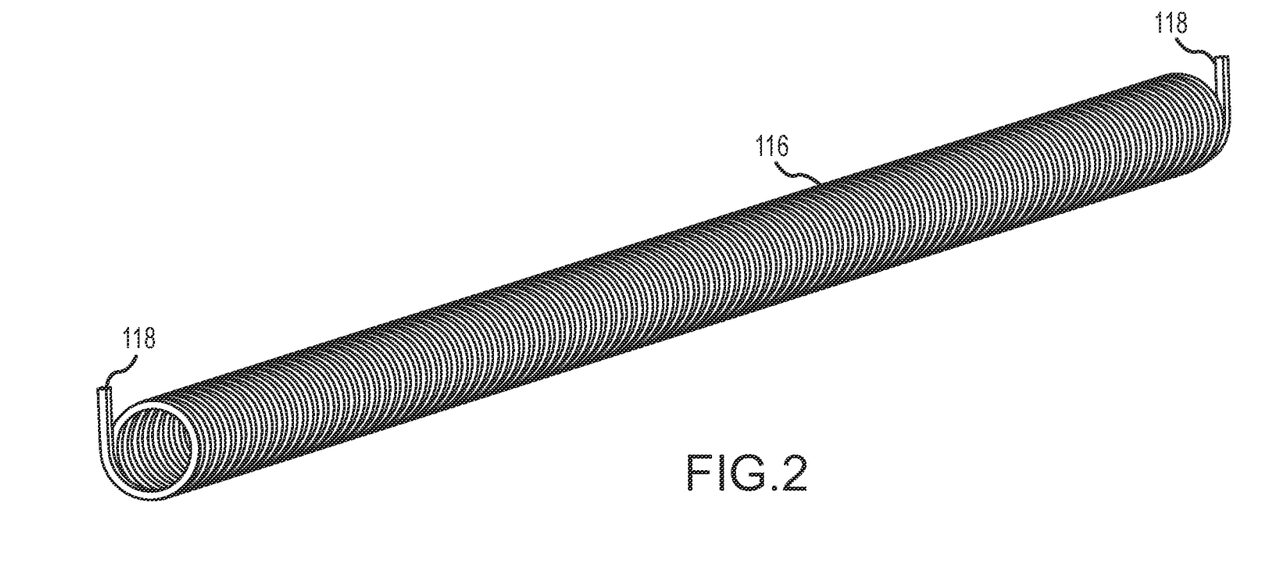
FIG. 2 is a separate perspective view of a spring coil helix utilized in the coil clad hose in accordance with the present disclosure.

Two carriages 112 and 114, each with a central bore therethrough, are mounted on the rail 102 so as to travel along the rail 102 and to accommodate passage of a length of flat coil spring wire helix 116 through the bores of the carriages 112 and 114. An exemplary helix 116 is separately shown in FIG. 2. Each end of the helix 116 is formed with a tangential end forming a tang 118. Each of the carriages 112 and 114 includes a tubular tang clamp bushing 124 through which the helix 116 passes.

Figure 3:
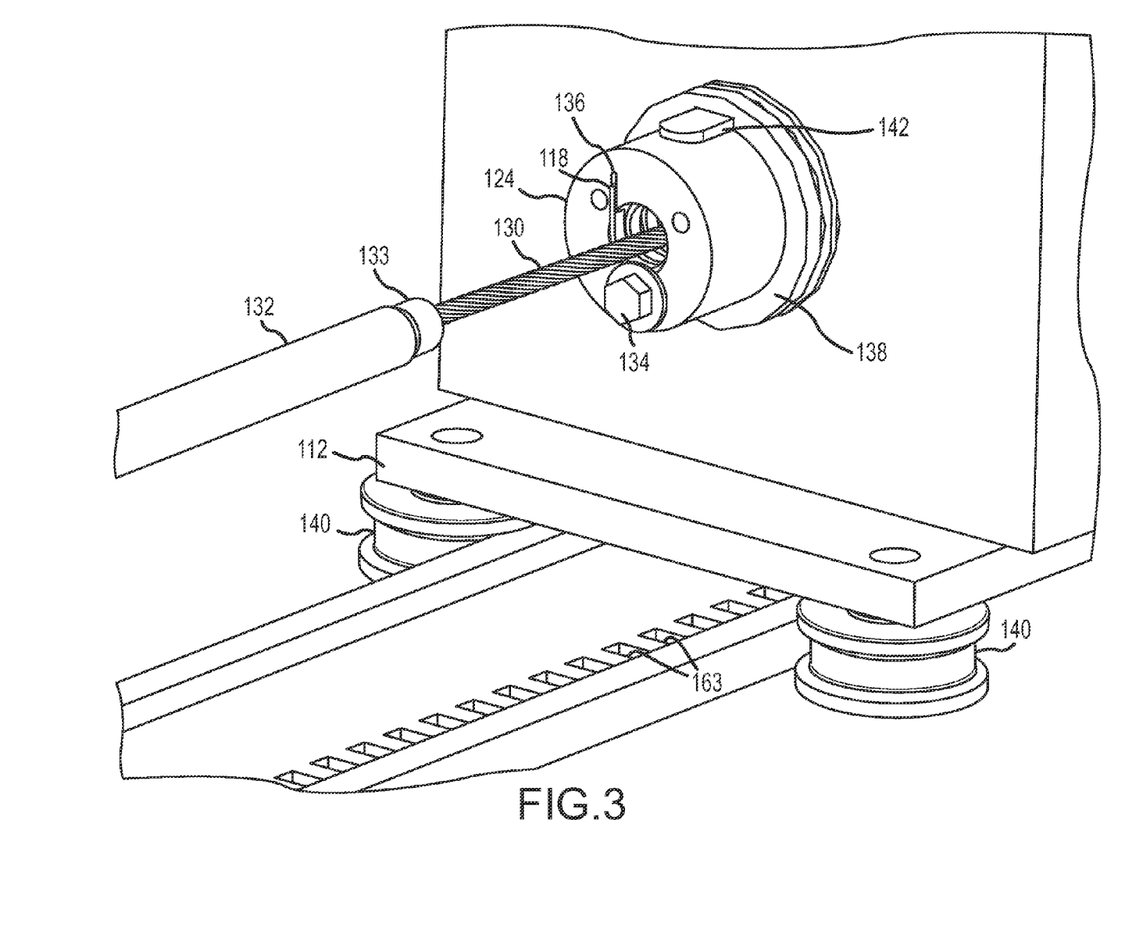
FIG. 3 is a close up view of one end of the spring coil expander in the apparatus shown in FIG. 1.

Carriage 112 includes a gearbox 120 driven by a motor 122. The gearbox 120 drives a hollow output shaft 138 as is best shown in the close up view of carriage 112 in FIG. 3. In FIG. 3, the tang 118 at a left end of a helix 116 fits within a tang slot 136 in the bushing 124. The tubular output shaft 138 of the gearbox 120 captures the tang clamp bushing 124 carried by the carriage 112. The tang 118 is held in the tang slot 136 of the clamp bushing 124 via a clamp bolt 134. The tang 118 at the opposite end of the helix 116 is similarly fastened in the carriage 114. The top of the square tube rail 102 has a series of longitudinally spaced lateral notches to form rack teeth 163 therein configured to engage a pinion gear 162 of a traversing gearbox 160 shown and explained in further detail below with reference to FIGS. 11 and 12.

Wire clamps 126 and 128 are fastened to each end of the rail 102. These wire clamps 126 and 128 support a support member, preferably a stranded wire cable 130 tensioned therebetween as is shown in FIG. 1. Threaded onto the cable 130 prior to tensioning, in sequence, are a hose 132 and the helix 116. The wire coil helix 116 is passed through the central bore through of each of the carriages 112 and 114. The ends of the cable 130 are clamped so as to suspend the hose 132 and helix 116 and the cable is tensioned to several hundred pounds force.

Each of the carriages 112 and 114 is then moved via rollers 140 along the rail 102, to a position as shown in FIG. 1, to capture the opposite ends of the helix 116 and receive the tangs 118 in the slots 136 in the carriages. The clamp bolts 134 engaging the tangs 118 are then tightened to hold and suspend the helix 116 between the carriages 112 and 114.

Alternatively a helix 116 may first be suspended between carriages 112 and 114 mounted on the rail 102 and fastened to the bushings 124 as above described. Then a cable 130 can be threaded through a predetermined length of hose 132, and then passed through the carriages 112 and 114 and the suspended helix 116. The cable 130 can then be passed through and then clamped to wire clamps 126 and 128. Finally, the cable 130 is tensioned appropriately so as to suspend the hose and helix in substantial coaxial alignment.

Figure 4:
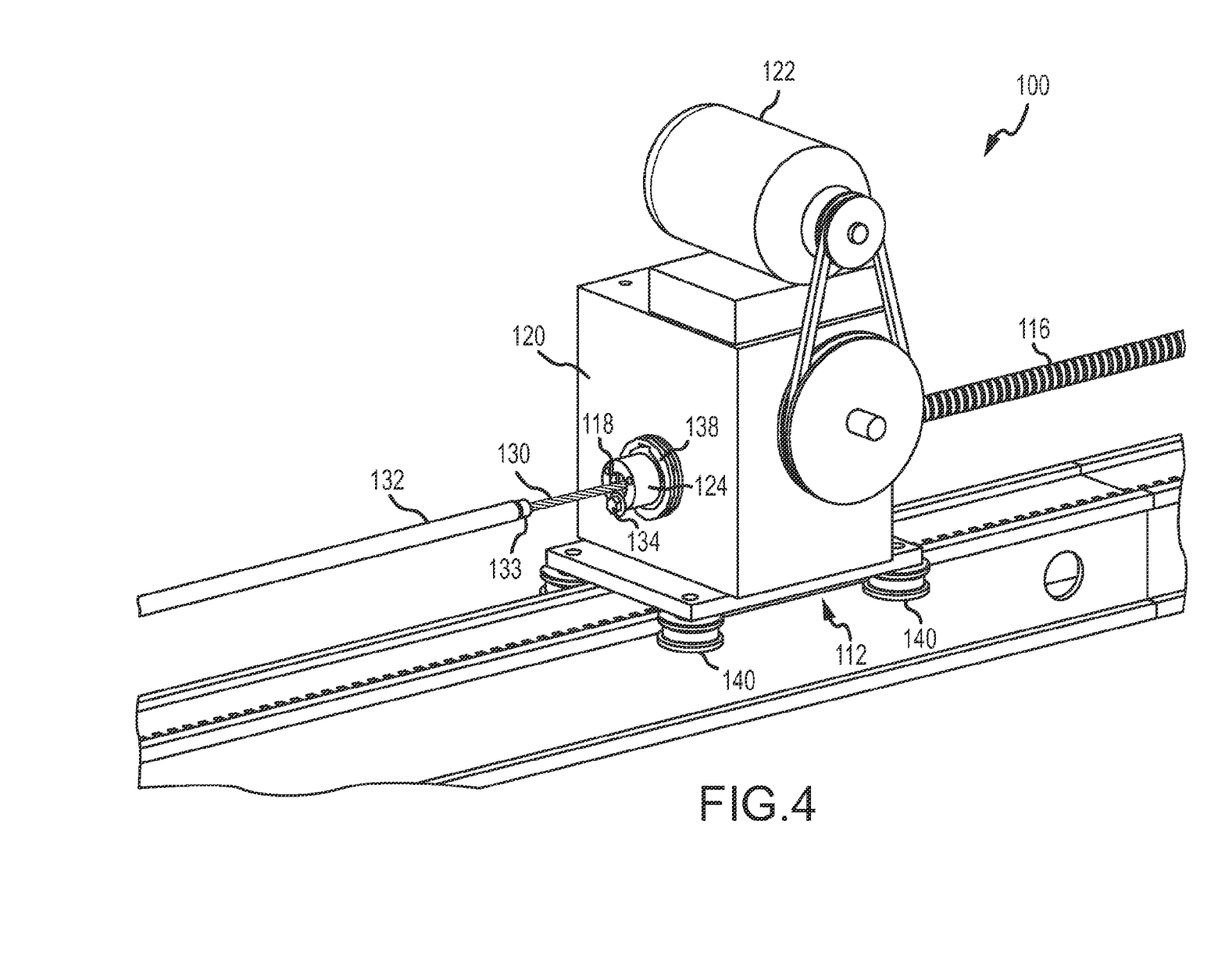
FIG. 4 is another perspective view of the expander shown in FIG. 3.

A close-up view of the rotary drive carriage 112 is shown in FIG. 4. The right end of the helix 116 is captured by tang bushing 124 and clamp bolt 134 of the carriage 114 and held in a fixed rotational position on the rail 102 while the carriage 114 is free to roll along the rail 102 via rollers 140. The rotary drive carriage 112 is also free to roll along the rail 102. However, the tang bushing 124 holding the left end of the helix 116 is held fixed to the output shaft 138 of the gearbox 120 of the carriage 112 by a key 142 such that the bushing 124 rotates with the output shaft 138.

Figure 5:
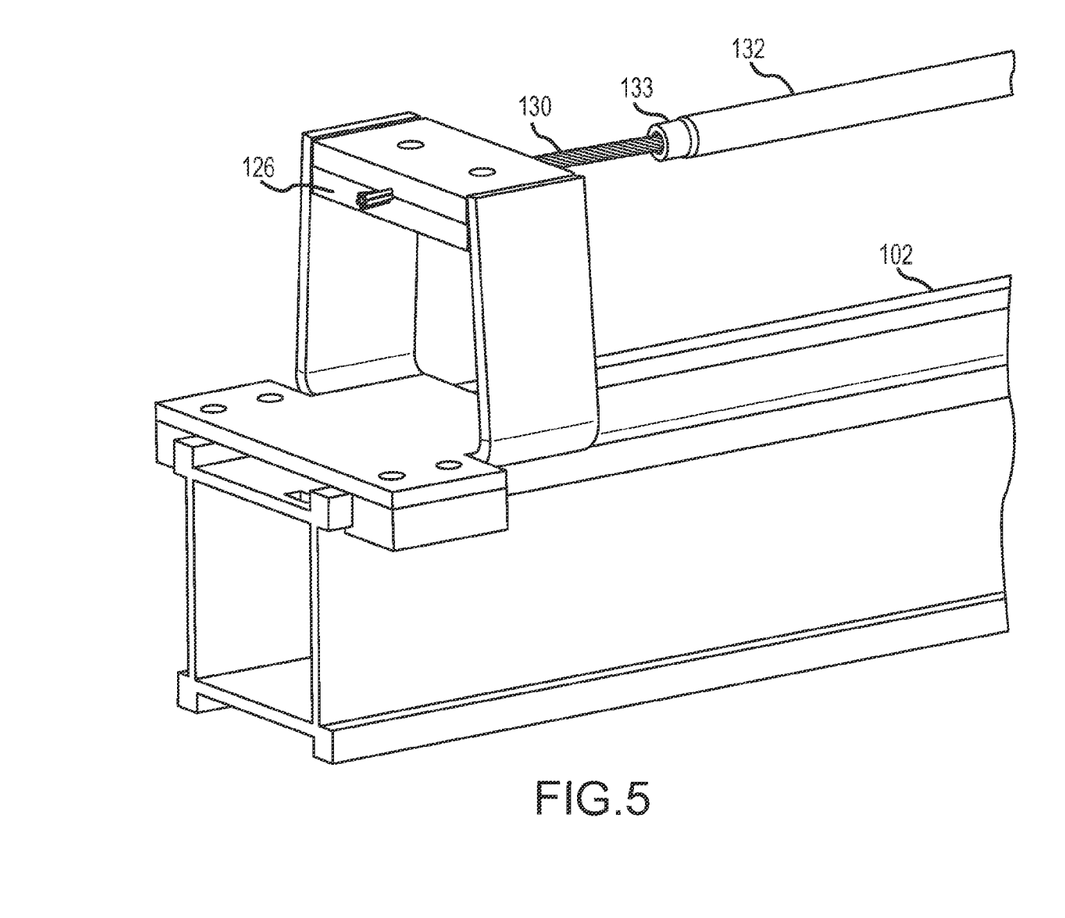
FIG. 5 is a cable clamp end perspective view of the apparatus shown in FIG. 1.
Figure 6:
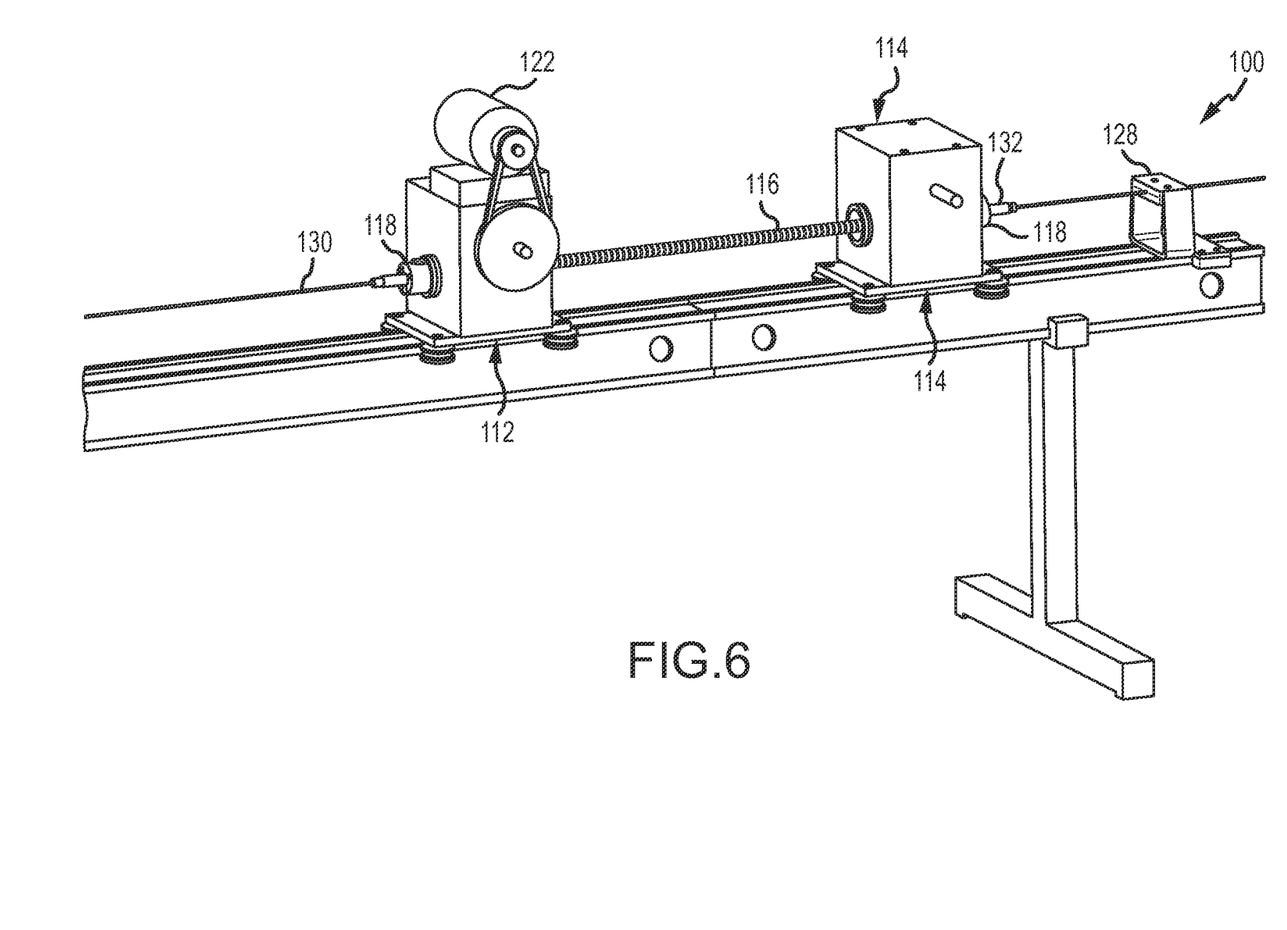
FIG. 6 is a partial perspective view of the apparatus shown in FIG. 1 with the coil spring expanded and hose inserted through the expanded coil spring.

Referring to the close up view of the left end of the assembly 100 shown in FIG. 5, the cable 130 is rigidly tensioned in the cable clamp 126 that is fastened to the left end of the rail 102. Turning back to FIG. 4, when the tang clamp bushings 124 in the carriages 112 and 114 each fasten to one of the tangs 118 to capture the helix securely therebetween, the motor 122 is energized to twist the left end of the helix 116 counterclockwise to expand the helix 116 from its relaxed state to a diameter greater than that of the hose 132 positioned on the cable 130. When the helix 116 is in a relaxed state, its inside diameter is less than the outer diameter of the hose 132. When the helix 116 is expanded sufficiently, the hose can be passed through the helix 116 to a position as shown in FIG. 6. The motor 122 is then reversed, permitting the helix 116 to contract onto the hose 132. This contraction is driven by the elastic energy stored in the helix 116 during the expansion operation.

Figure 7:
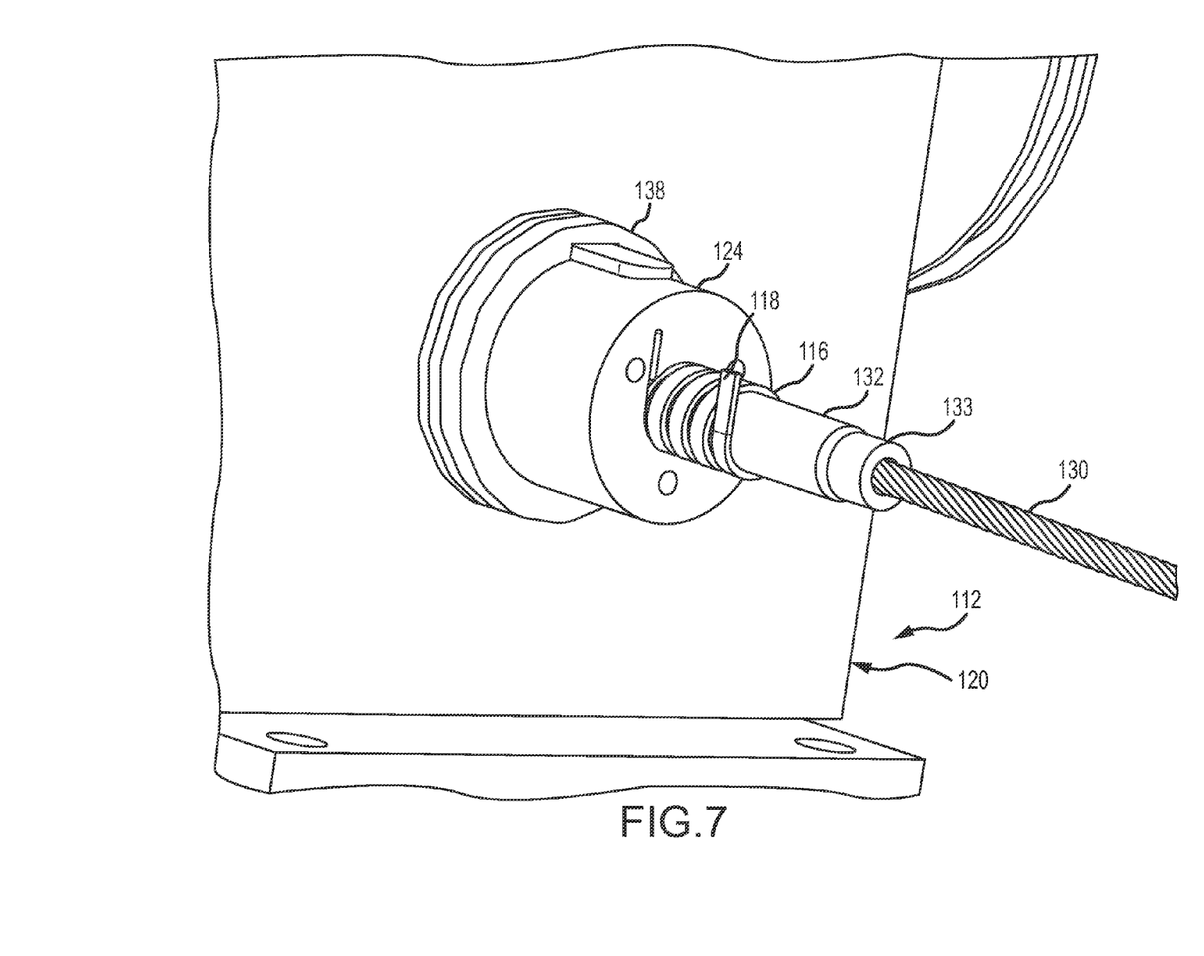
FIG. 7 is a close-up perspective view of one end of the coil spring on the hose as shown in FIG. 6 during the trim tang operation.

FIG. 7 shows an enlarged end view of one of the carriages 112 or 114 with the helix 116 relaxed and compressively wrapped about the hose 132. Each of the tang locking bolts 134 have been removed and the carriages 112 and 114 moved closer together to expose the tangs 118 at each end of the helix 116. The tangs 118 are then removed preferably by grinding, being careful not to overheat the ends of the helix 116. The assembled hose 132 with helix 116 is then removed from the wire 130 held by the apparatus 100.

Figure 8:
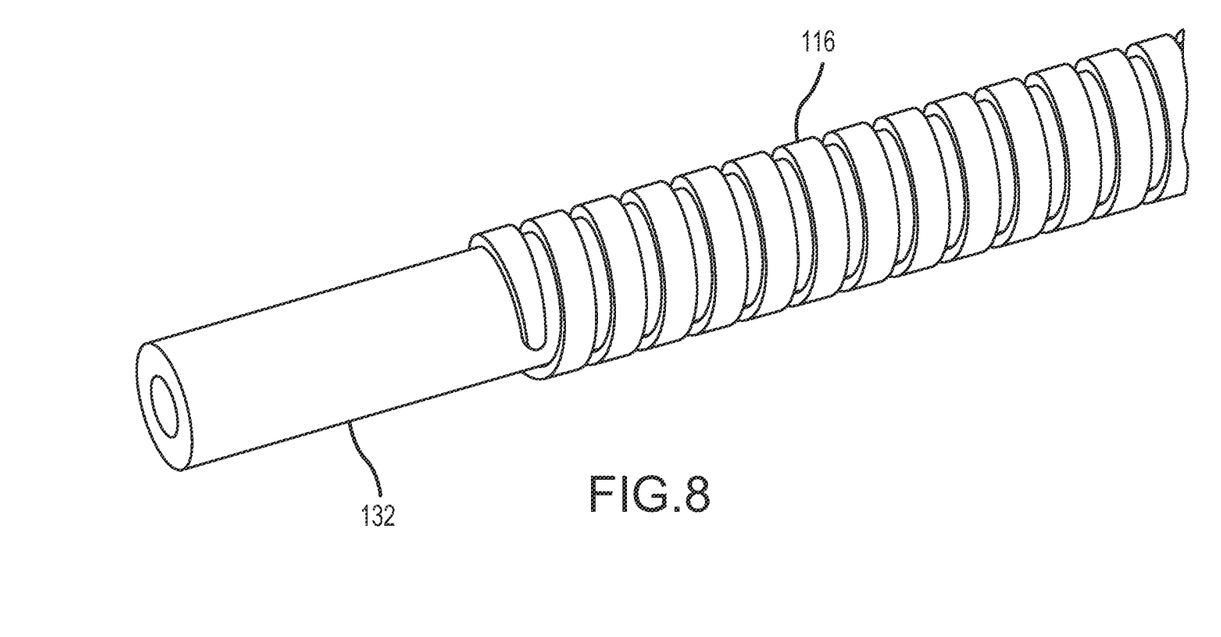
FIG. 8 is a separate perspective view of one end of the coil spring on the hose after a hose trim operation.
Figure 9:
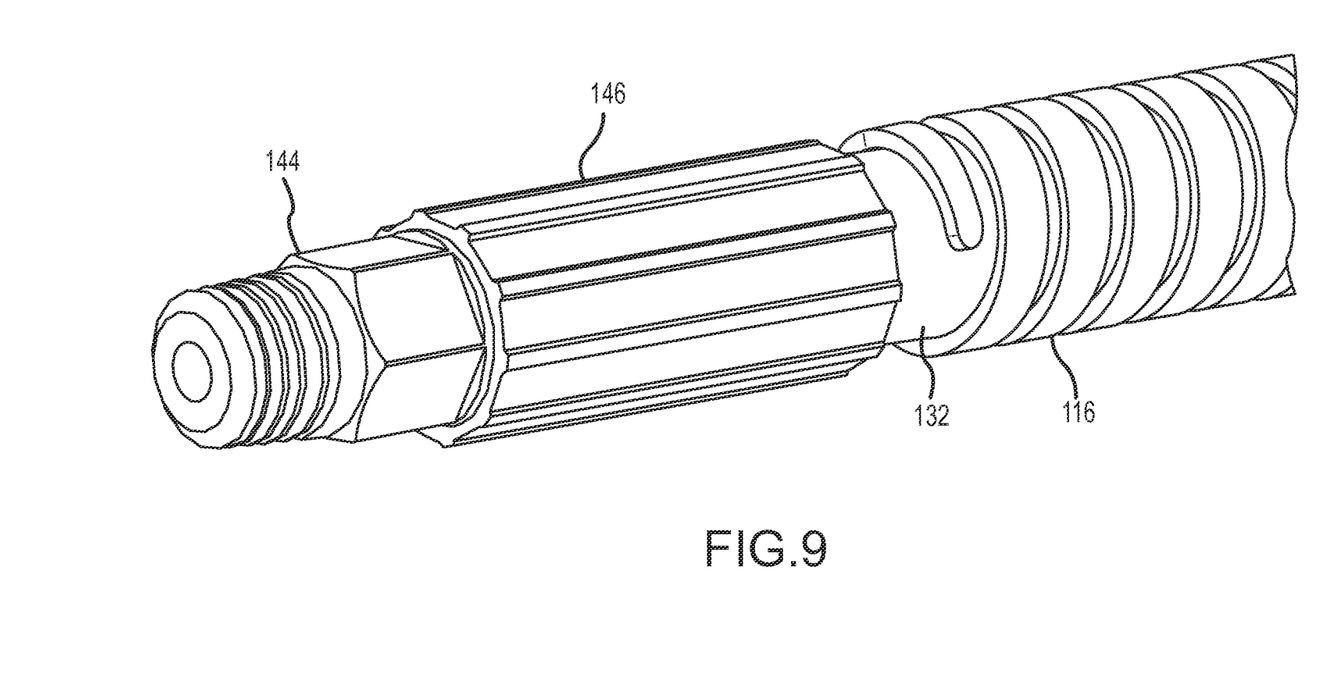
FIG. 9 is a separate view of the end fitting on the coil spring clad hose after fitting of a swaged ferrule.

The hose ends, with temporary compression sleeves 133 seen in FIGS. 3-7, are then trimmed off so that a permanent end fitting 144 can be accommodated thereon. FIG. 8 shows the coil 116 wrapped on the hose with the hose length properly trimmed to length. An end fitting 144 is then installed onto the hose 132 and a ferrule 146 swaged over the end fitting and the end of the hose 132. This swaged ferrule, shown in FIG. 9, has an outer diameter larger than the helix 116 installed on the hose 132.

The end fitting 144 and ferrule 146 are preferably installed onto the hose 132 by the hose manufacturer. By keeping the helix outer diameter, when installed on the hose 132, smaller than the crimped size of the ferrule 146, there is no interference of the helix 116 in the crimping die (not shown).

Figure 10:
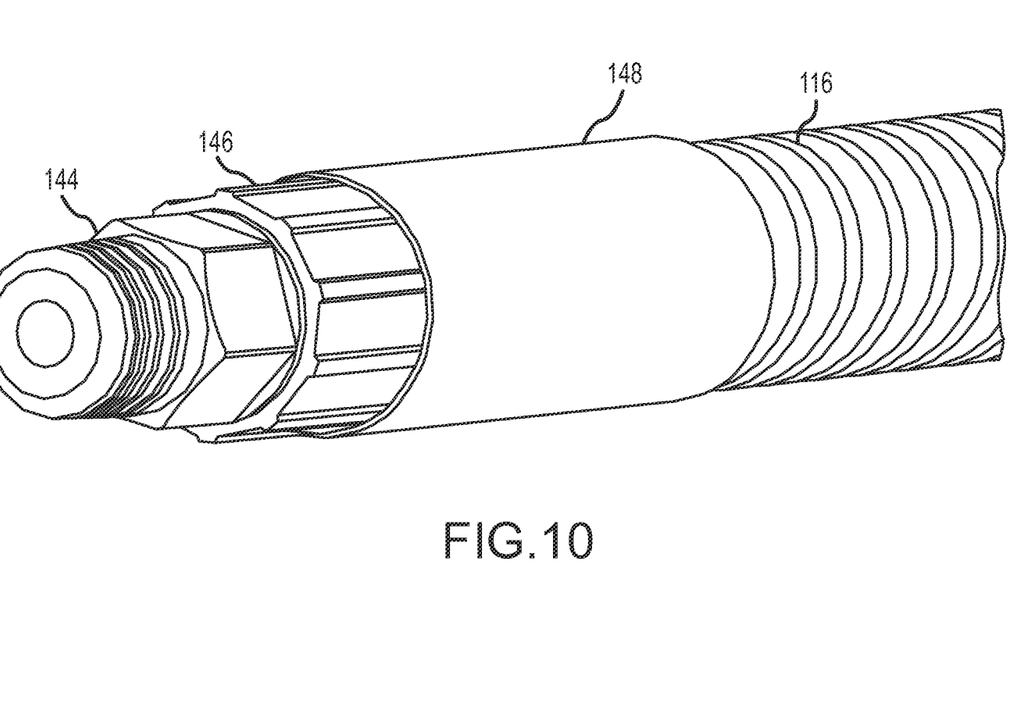
FIG. 10 is a separate perspective view of the hose end fitting shown in FIG. 9 after installation of a sleeve.

There is a tendency for the helix 116 to slide or rotate in relation to the hose 132 during use of the assembled coil clad hose. It is important for the helix 116 to resist relative movement under axial and rotary force applied to the assembled coil clad hose. Thus, as shown in FIG. 10, a thin metal sleeve 148 is next installed over the ferrule 146 on one end of the assembled hose 132 and over the joint between the helix 116 and the ferrule 146. This sleeve 148 is then bonded to the helix 116, the hose 132 and ferrule 146. A suitable bond is preferably formed by an expansive moisture-activated polyurethane glue such as a Gorilla Glue type product.

Figure 11:
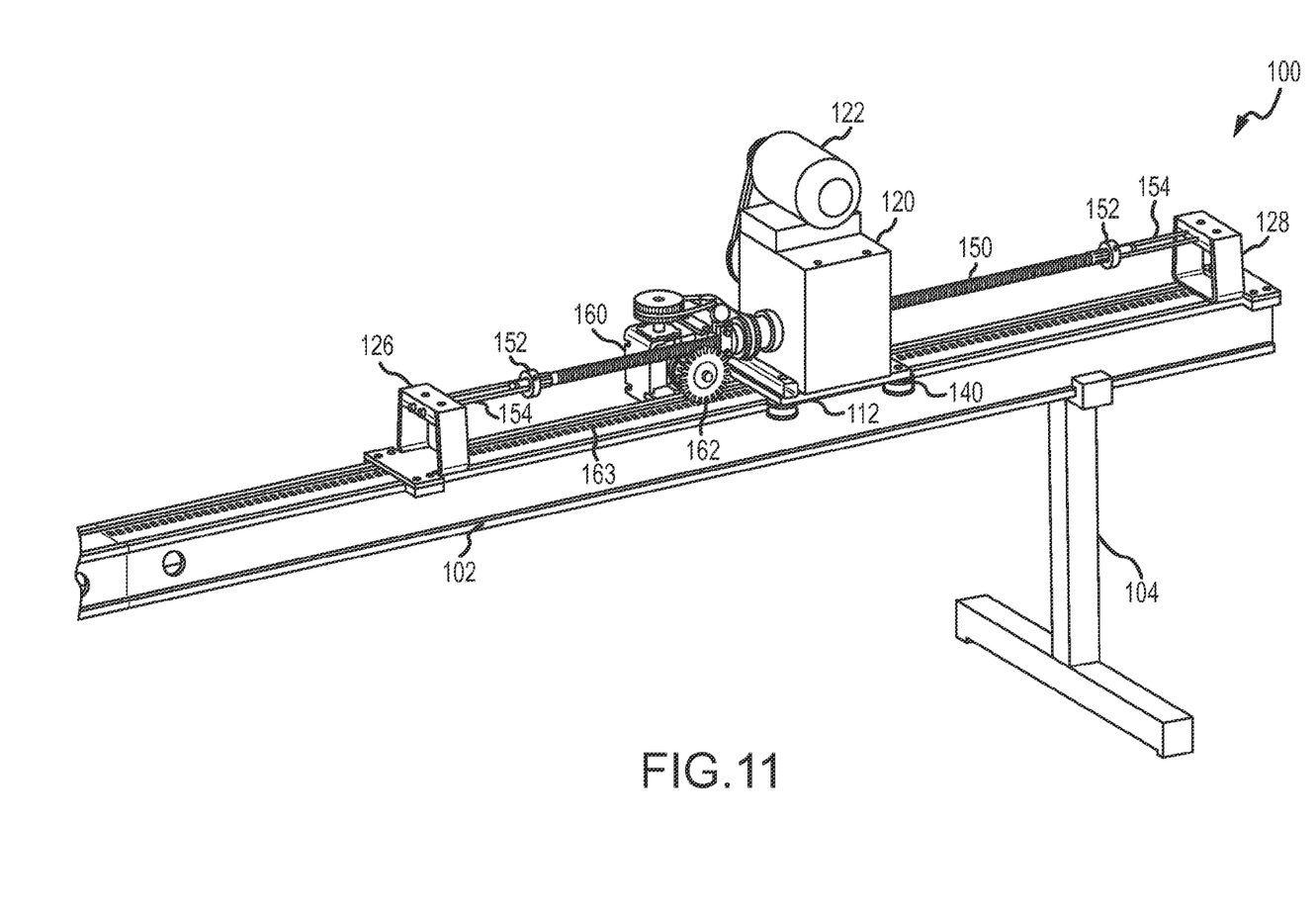
FIG. 11 is a side perspective view of the apparatus shown in FIG. 1 during coil tightening and pitch adjustment of the coil spring on the hose.

After bonding and curing one end of the hose in this manner, the assembled hose 150 is inserted back onto the apparatus 100, through one of the gearboxes 112 and 114 mounted on the rail 102. The hose assembly 150 is tensioned between the cable clamps 126 and 128 by hose end clamps 152 fastened to pull rods 154 as is shown in FIG. 11. A traversing gearbox 160 is then mounted to the carriage 112. This traversing gearbox includes a pinion gear 162 that engages the rack teeth 163 in the top side of the rail 102. The rotation of the gearbox 160 is synchronized with the motion of the carriage 112 so as to generate the exact pitch (distance per revolution) desired in the finished coiled hose assembly. In the specific hose assembly previously mentioned, the finished adjusted pitch is 0.266", which matches the drive sprocket of the drive mechanism described in the hose propelling system mentioned above.

Figure 12:
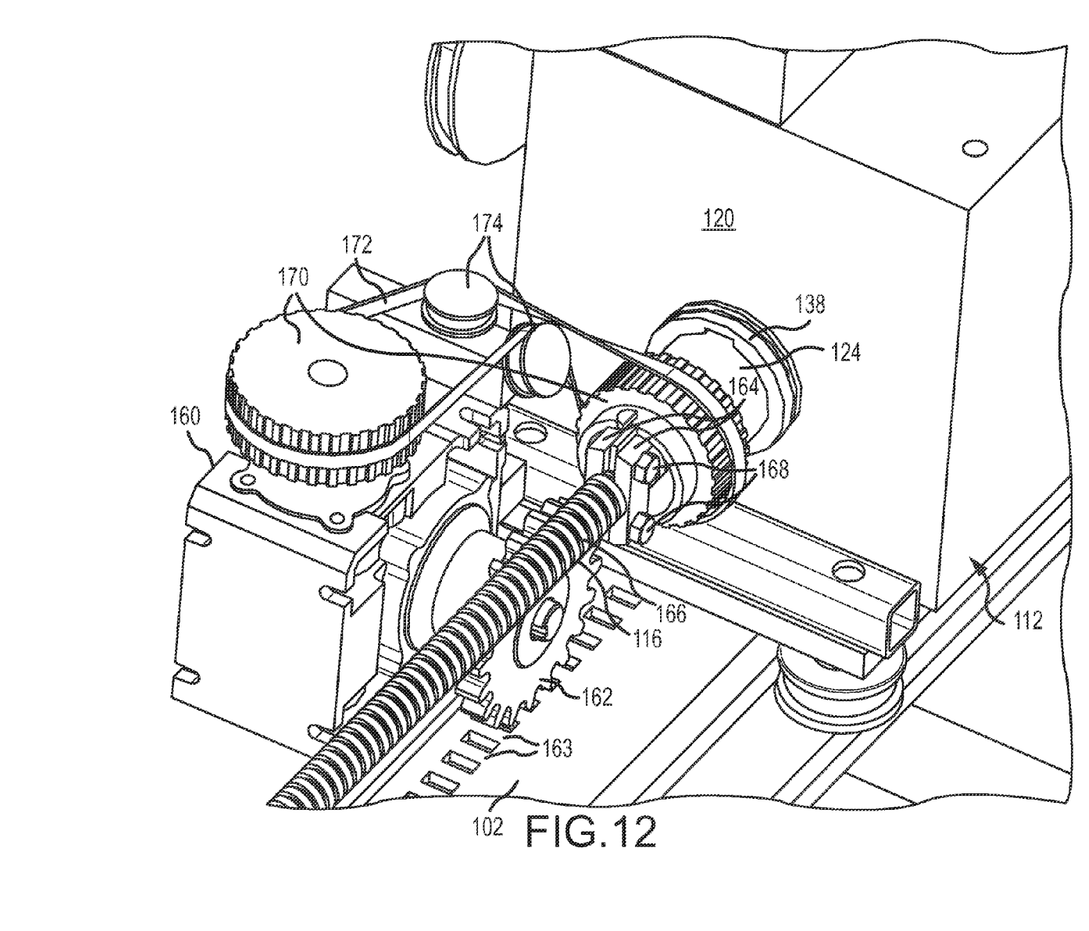
FIG. 12 is a close up perspective view of the coil tightening and pitch adjustment device on the apparatus shown in FIG. 11.

A detailed view of this portion of the apparatus 100 shown in FIG. 11 is shown in FIG. 12. The traversing gearbox 160 is fitted with a sprocket 170, belt 172 and idlers 174 that engage a sprocket 10 on the bushing 124 on the gearbox 120 of the carriage 112. The bushing 124 is fitted with a sprocket 170 and a split drag nut 164 configured to engage each of the coil turns 166 of the helix 116. The split drag nut 164 is clamped onto the helix 116 via drag adjustment bolts 168. The traverse gearbox 160 is operated by motor 122 on gearbox 120 via the interconnecting linkage sprockets 170 to cause the drag nut 164 to rotate around the helix 116 while the pinion 162 causes the drag nut 164 to move axially along the helix 116 to impart the desired spacing or pitch to each turn on the helix 116 on the hose 132. This results in the coil hose assembly having the exact pitch desired in the finished coil clad hose.

As the drag nut 164 is driven in translation and rotation it compresses each turn 166 of the helix 116 further onto the hose 132 thus tightening it onto the hose 132. Starting at the bonded end and progressing toward the free end of the helix 116, the slack is thus removed from the helix 116 as it is tightened onto the hose 132. When the drag nut 164 reaches the free end of the helix 116 on the hose 132, any excess wire helix is removed if it overlaps the ferrule 146.

At this point the hose end clamp 152 adjacent the drag nut 164 is removed (FIG. 11). This frees up the ferrule 146 on that end of the hose 132. A second metal sleeve 148 is then slipped over the ferrule 146 and bonded to the hose 132, the ferrule 146 and the end of the helix 116 to complete the assembly of the finished coil clad hose product. The bonded sleeves at each end thus maintain the tension between the hose 132 and the helix 116 and prevent any relative movement of the ends of the helix 116 on the hose 132.

The hose 132 may have its ends fitted with compression sleeves 133 to reduce the hose diameter at each end. This will permit easy passage of the hose into and though the expanded helix 116 as above described. Such compression sleeves 133 are removed when cutting the assembled helix wrapped hose before installation of the end fittings 144 and ferrules 146.

All such embodiments, changes, alternatives and equivalents in accordance with the features and benefits described herein, are within the scope of the present disclosure. Such changes and alternatives may be introduced without departing from the spirit and broad scope of my invention as defined by the claims below and their equivalents.

What is claimed is:

1. A method of assembling a coil clad hose, the method comprising:
    suspending a spring wire coil helix having opposite ends between first and second carriages mounted on an axially extending rail;
    rotating one of the ends of the wire coil helix to expand the wire coil helix;
    inserting a hose through the expanded helix;
    counter rotating the one end to contract the helix onto the hose;
    installing an end fitting and a ferrule onto each end of the hose;
    fixing one end of the helix together with the ferrule and the hose at one end of the hose;
    adjusting a pitch of at least a portion of the helix along the hose; and
    fixing the wire coil helix and the hose together with the ferrule at the opposite end of the hose.

2. The method of claim 1 wherein the suspending act includes inserting a tang formed at a first end of the wire coil helix into a tang slot in a clamp bushing mounted to the first carriage.

3. The method of claim 2 further comprises inserting a second end of the coil helix into the second carriage and through another clamp bushing carried by the second carriage.

4. The method of claim 3 wherein the rotating is caused by rotating the clamp bushing carried by one of the first and second carriages.

5. A method of assembling a coil clad hose, the method comprising:
    providing an elongated rigid rail having a first end and a second end, a first end clamp mounted on the first end of the rail, a second end clamp mounted on the second end of the rail, a first movable carriage mounted on the rail and spaced from the first end of the rail, the first carriage having a first through passage, the carriage including a gearbox and a first coil tang bushing mounted around the first through passage, a second movable carriage mounted on the rail and spaced between the first carriage and the second end of the rail, the second carriage having a second through passage;

inserting a support member sequentially through a hose and a spring wire coil helix;

fastening one end of the support member to the first clamp and an opposite end of the support member to the second clamp with the spring wire coil helix suspended between the first and second carriages;

rotating one of the ends of the wire coil helix to expand the wire coil helix;

inserting the hose through the expanded helix;

counter rotating the one end to contract the helix onto the hose;

installing an end fitting and a ferrule onto each end of the hose;

fixing one end of the helix together with the ferrule and the hose to one end of the hose;

adjusting a pitch of the helix along at least a portion of the hose; and fixing the wire coil helix and the hose together with another ferrule at the opposite end of the hose.

6. The method of claim 5 wherein the rotating includes inserting a tang formed at a first end of the wire coil helix into a tang slot in a clamp bushing mounted to the first carriage.

7. The method of claim 6 further comprises inserting a second end of the coil helix through a passage through the second carriage and through another clamp bushing mounted to the second carriage.

8. The method of claim 6 wherein the rotating is caused by rotating the clamp bushing mounted to the first carriage.

9. The method according to claim 8 wherein the adjusting includes adjusting the pitch of the helix along the hose substantially from one end of the helix to the other end of the helix.

10. The method of claim 5 wherein the support member is a wire cable.

11. The method of claim 5 wherein rotating further comprises:

inserting the wire coil helix through a passage through the first carriage and through another passage through the second carriage;

inserting a tang formed at a first end of the wire coil helix into a tang slot in a clamp bushing mounted to the first carriage;

inserting another tang formed at a second end of the wire coil helix into a tang slot in another clamp bushing mounted to the second carriage; and holding the another tang at the second end of the wire coil helix stationary in the another clamp bushing.

12. A method of assembling a coil clad hose, the method comprising:

providing an elongated rigid rail having a first end and a second end, a first end clamp mounted on the first end of the rail, a second end clamp mounted on the second end of the rail, a first movable carriage mounted on the rail and spaced from the first end of the rail, the first carriage having a first through passage, the carriage including a gearbox and a first coil tang bushing mounted around the first through passage, a second movable carriage mounted on the rail and spaced between the first carriage and the second end of the rail, the second carriage having a second through passage;

suspending a spring wire coil helix between the first and second carriages;

rotating one of the ends of the wire coil helix to expand the wire coil helix;

inserting the hose through the expanded helix;

counter rotating the one end to contract the helix onto the hose;

installing an end fitting and a ferrule onto each end of the hose;

fixing one end of the helix together with the ferrule and the hose to one end of the hose;

adjusting a pitch of the helix along at least a portion of the hose; and fixing the wire coil helix and the hose together with another ferrule at the opposite end of the hose.

13. The method according to claim 12 wherein the adjusting includes adjusting the pitch of the helix along the hose substantially from one end of the helix to the other end of the helix.

\* \* \* \* \*

UNITED STATES PATENT AND TRADEMARK OFFICE
CERTIFICATE OF CORRECTION

PATENT NO. : 9,844,845 B1
APPLICATION NO. : 14/693477
DATED : December 19, 2017
INVENTOR(S) : Zink It is certified that error appears in the above-identified patent and that said Letters Patent is hereby corrected as shown below:

In Column 5, Line 41, delete "gearboxes" and insert -- carriages --, therefor.

In Column 6, Line 23, delete "though" and insert -- through --, therefor.

Signed and Sealed this
Thirteenth Day of March, 2018

Andrei Iancu
*Director of the United States Patent and Trademark Office*